United States Patent
Liu et al.

(10) Patent No.: US 10,340,831 B2
(45) Date of Patent: Jul. 2, 2019

(54) WIND POWER GENERATOR VIBRATION INHIBITION METHOD AND DEVICE (71) Applicant: BEIJING GOLDWIND SCIENCE & CREATION WINDPOWER EQUIPMENT CO., LTD., Beijing (CN)

(72) Inventors: Yong Liu, Beijing (CN); Xiaohe Zhang, Beijing (CN); Xiang Zhao, Beijing (CN)

(73) Assignee: Beijing Goldwind Science & Creation Windpower Equipment Co., Ltd., Beijing (CN)

( * ) Notice: Subject to any disclaimer, the term of this patent is extended or adjusted under 35 U.S.C. 154(b) by 0 days.

(21) Appl. No.: 15/576,107

(22) PCT Filed: Nov. 25, 2015

(86) PCT No.: PCT/CN2015/095569
§ 371 (c)(1),
(2) Date: Nov. 21, 2017

(87) PCT Pub. No.: WO2016/188069
PCT Pub. Date: Dec. 1, 2016

(65) Prior Publication Data
US 2018/0175764 A1   Jun. 21, 2018

(30) Foreign Application Priority Data
May 27, 2015  (CN) .......................... 2015 1 0280381

(51) Int. Cl.
*F03D 9/25* (2016.01)
*H02P 9/14* (2006.01)
(Continued)

(52) U.S. Cl.
CPC ............ *H02P 21/0089* (2013.01); *F03D 9/25* (2016.05); *H02P 9/14* (2013.01); *H02P 21/00* (2013.01);
(Continued)

(58) Field of Classification Search
USPC .................................... 322/20; 318/434, 798
See application file for complete search history.

(56) References Cited

U.S. PATENT DOCUMENTS

| 4,642,546 A * | 2/1987 | Schonherr ............. H02P 29/025 318/798 |
| 6,448,735 B1 | 9/2002 | Gokhale et al. |

(Continued)

FOREIGN PATENT DOCUMENTS

| CN | 101764567 A | 6/2010 |
| CN | 103269191 A | 8/2013 |

(Continued)

OTHER PUBLICATIONS

Office Action issued by the State Intellectual Property Office of People's Republic of China in Chinese Patent Application No. 201510280381.8, dated Mar. 7, 2017.
(Continued)

*Primary Examiner* — Pedro J Cuevas
(74) *Attorney, Agent, or Firm* — Finnegan, Henderson, Farabow, Garrett & Dunner, LLP (57) ABSTRACT

A vibration suppression method and device of a wind power generator is provided. The method includes: calculating a specified value of a flux-weakening control parameter of the generator according to a preset value of an electromagnetic active power of the generator and a frequency of the generator; and controlling the generator according to the specified value of the flux-weakening control parameter of the generator. The method and device reduce the magnetic
(Continued)

load of the generator by the flux-weakening control, thereby suppress vibration and noise of the generator.

14 Claims, 4 Drawing Sheets

(51) Int. Cl.
    *H02P 21/00* (2016.01)
    *H02P 21/05* (2006.01)
    *H02P 21/10* (2016.01)
    *H02P 21/22* (2016.01)
    *H02P 101/15* (2016.01)

(52) U.S. Cl.
    CPC .............. *H02P 21/05* (2013.01); *H02P 21/10* (2013.01); *H02P 21/22* (2016.02); *F05B 2220/7064* (2013.01); *F05B 2260/96* (2013.01); *H02P 2101/15* (2015.01); *Y02E 10/725* (2013.01)

(56) References Cited

U.S. PATENT DOCUMENTS

| | | | |
|---|---|---|---|
| 8,164,288 B2 | 4/2012 | Hida et al. | |
| 8,988,035 B2* | 3/2015 | Wang | H02P 23/14 318/798 |
| 9,444,391 B2* | 9/2016 | Le Peuvedic | F01D 15/10 |
| 2009/0284195 A1 | 11/2009 | Gallegos-Lopez et al. | |
| 2014/0100701 A1 | 4/2014 | Hakumura et al. | |
| 2014/0167674 A1* | 6/2014 | Wang | H02P 23/14 318/798 |
| 2014/0265709 A1* | 9/2014 | Berding | H02K 19/20 310/168 |
| 2015/0028792 A1* | 1/2015 | Tang | H02P 21/06 318/798 |
| 2015/0084565 A1* | 3/2015 | Le Peuvedic | F01D 15/10 318/434 |
| 2015/0180398 A1* | 6/2015 | Tang | H02P 23/14 318/798 |
| 2016/0290320 A1 | 10/2016 | Deng et al. | |
| 2018/0198395 A1* | 7/2018 | Gieras | H02P 9/32 |
| 2018/0262091 A1* | 9/2018 | Gieras | H02K 21/042 |

FOREIGN PATENT DOCUMENTS

| | | |
|---|---|---|
| CN | 103414422 A | 11/2013 |
| CN | 104135202 A | 11/2014 |
| CN | 104967378 A | 10/2015 |
| EP | 3076542 A1 | 10/2016 |
| JP | 2009-268267 A | 11/2009 |
| JP | 2015-070781 A | 4/2015 |

OTHER PUBLICATIONS

International Search Report issued by the State Intellectual Property Office of People's Republic of China for International Application No. PCT/CN2015/095569, dated Jan. 18, 2016.

Hai-jun Xu et al., "Research on High Voltage Direct Current Generation System of Permanent Magnet Synchronous Generator Based on Direct Torque Control," Power Electronics, vol. 46, issue 1, dated Jan. 31, 2012.

Zhao-yang Zhang et al., "Research on the High Performance Flux-weakening Control Strategy of Permanent Magnetic Synchronous Generator for Wind Turbine," dated Dec. 31, 2013.

Notification of Reasons for Refusal issued by the Korean Intellectual Property Office in Korean Patent Application No. 10-2017-7034973, dated Oct. 30, 2018.

Extended European Search Report issued by the European Patent Office in counterpart European Application No. 15893137.8, dated Nov. 16, 2018.

Shoudao Huang, et al., "Maximum Torque Per Ampere and Flux-weakening Control for PMSM Based on Curve Fitting", Vehicle Power and Propulsion Conference (VPPC), IEEE, dated Sep. 1, 2010, pp. 1-5, ISBN: 978-1-4244-8220-7.

\* cited by examiner

WIND POWER GENERATOR VIBRATION
INHIBITION METHOD AND DEVICE

This application is a National Stage application of PCT international application PCT/CN2015/095569, filed on Nov. 25, 2015 which claims priority to Chinese Patent Application No. 201510280381.8, filed with the Chinese Patent Office on May 27, 2015, both of which are incorporated herein by reference in their entireties.

FIELD

The present disclosure relates to the technical field of wind power, and in particular to a vibration suppression method and device of a wind power generator.

BACKGROUND

Wind power generator is an important device for transforming mechanical energy into electric energy. In a wind power generator, there exist electromagnetic forces of multiple different frequencies such as fundamental wave, harmonic frequencies, a cogging frequency and frequency multiplication thereof, etc. In addition, the stator and rotor of the wind power generator have complicated mechanical structure modal. When a force wave order and a frequency of electromagnetic force of the generator correspond to a vibration mode order and a frequency of a stator and rotor mechanical structural modal of the generator respectively, resonance occurs, which results in outstanding vibration and noise problems. By decreasing a magnetic load of the generator, i.e., by decreasing electromagnetic force on stator and rotor of the generator, vibration amplitude of the stator and rotor of the generator is decreased, thereby suppressing vibration and noise of the generator, and implementing an objective of vibration damping and noise reduction.

In an existing technology, the magnetic load of the generator is decreased by changing a mechanical structure and electromagnetic design thereof, such as by increasing the length of an air gap of the generator, optimizing the shape of magnetic pole, inclining the slot (that is, obliquely putting the coils against the stator and rotor of the generator), or inclining a magnetic pole (that is, inclining the magnetic pole) and so on.

With the change of the mechanical structure and the electromagnetic design of the generator, performances thereof, such as power density and force-energy index, are decreased, and the complexity of manufacturing processes and the cost of the generator are increased.

SUMMARY

A vibration suppression method and device of a wind power generator are provided according to an embodiment of the present disclosure, which can suppress the vibration and noise of the generator without changing a mechanical structure and an electromagnetic design of the generator. The method and device provided have no disadvantageous influence on performances of the generator such like power density and force-energy index, and does not result to an increase of the complexity of manufacturing processes and the cost of the generator.

To attain the foregoing objective, technical solutions in the following are applied in embodiments of the present disclosure.

A vibration suppression method of a wind power generator is provided according to the present disclosure, which includes: calculating a specified value of flux-weakening control parameter of the generator according to a preset value of an electromagnetic active power of the generator and a frequency of the generator; and controlling the generator according to the specified value of the flux-weakening control parameter of the generator.

A vibration suppression device of a wind power generator is provided, which includes: a calculation module configured to calculate a specified value of a flux-weakening control parameter of the generator according to a preset value of an electromagnetic active power of the generator and a frequency of the generator; and a control module configured to control the generator according to the specified value of the flux-weakening control parameter of the generator.

According to the vibration suppression method and device of the wind power generator provided by the present disclosure, a specified value of a flux-weakening control parameter of the generator is calculated according to a preset value of an electromagnetic active power and a frequency of the generator. Then, the generator is controlled according to the specified value of the flux-weakening control parameter of the generator. A magnetic load of the generator is decreased by flux-weakening control, so as to suppress vibration and noise of the generator. Since there is no need to change a mechanical structure and electromagnetic design of the generator, performances of the generator, such as power density and force-energy index, are not influenced, and the complexity of manufacturing process and the cost of the generator are not increased.

DETAILED DESCRIPTION OF THE
EMBODIMENTS

A vibration suppression method and device of a wind power generator according to embodiments of the present disclosure are described in further detail with reference to the accompanying drawings.

First Embodiment

Figure 1:
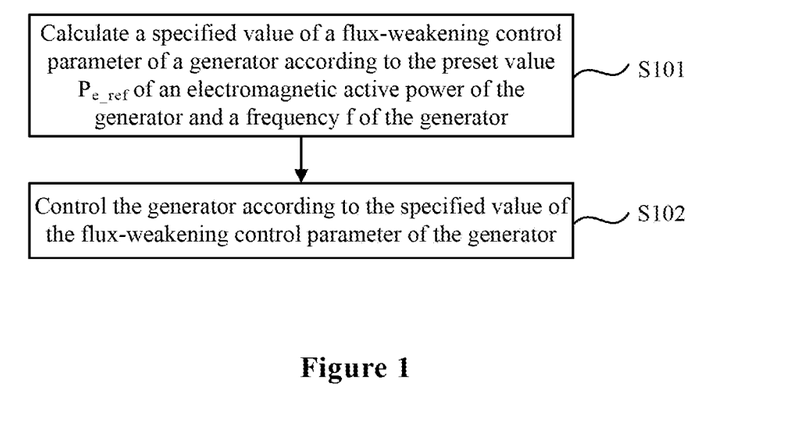
FIG. 1 is a flow chart of a vibration suppression method of a wind power generator according to an embodiment of the present disclosure.

Reference is made to FIG. 1, which is a flow chart of a vibration suppression method of a wind power generator according to an embodiment of the present disclosure. As shown in FIG. 1, the method may include the following steps S101 to S102.

In step S101, a specified value of a flux-weakening control parameter of a generator is calculated according to a preset value $P_{e\_ref}$ of an electromagnetic active power of the generator and a frequency f of the generator.

In step S102, the generator is controlled according to the specified value of the flux-weakening control parameter of the generator.

Specifically, the flux-weakening control parameter of the generator in the embodiment may be determined by a control mode of the generator. For example, when a current vector control is performed on the generator, the flux-weakening control parameters of the generator in the embodiment includes a specified value $I_{d\_ref}$ of a direct-axis current of the generator and a specified value $I_{q\_ref}$ of a quadrature-axis current of the generator. When a direct torque control is performed on the generator, the flux-weakening control parameter of the generator in the embodiment includes a set value $\psi_{f\_ref}$ of a flux linkage of the generator and a set value $T_{e\_ref}$ of an electromagnetic torque of the generator.

According to the vibration suppression method and device of the wind power generator provided by the present disclosure, a specified value of a flux-weakening control parameter of the generator is calculated according to a preset value of an electromagnetic active power and a frequency of the generator. Then, the generator is controlled according to the specified value of the flux-weakening control parameter of the generator. A magnetic load of the generator is decreased by flux-weakening control. That is, electromagnetic forces on the stator and the rotor of the generator are decreased and vibration amplitudes of the stator and the rotor of the generator are reduced, to realize vibration and noise suppression. Since there is no need to change a mechanical structure and electromagnetic design of the generator, performances of the generator such as power density and force-energy index are not influenced, and the complexity of manufacturing process and the cost of the generator are not increased.

Second Embodiment

Figure 2:
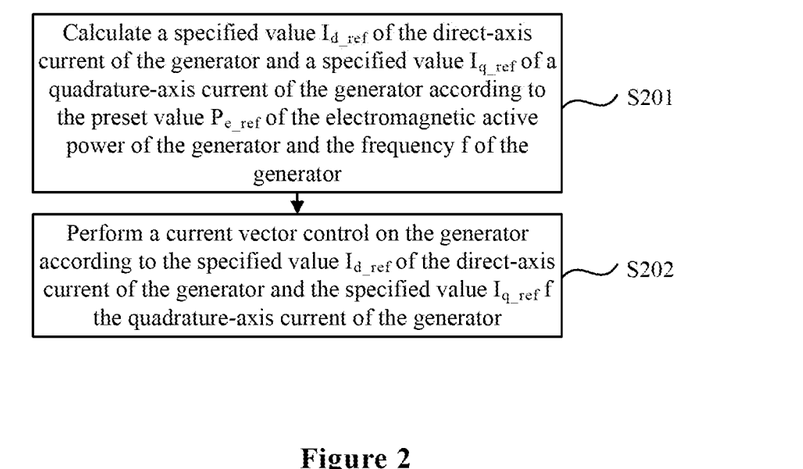
FIG. 2 is a flow chart of a vibration suppression method of a wind power generator according to an embodiment of the present disclosure.

Reference is made to FIG. 2, which illustrates a flow chart of a vibration suppression method of a wind power generator according to another embodiment of the present disclosure. As shown in FIG. 2, the vibration suppression method of the wind power generator according to this embodiment provides a specific implementation (in the case of performing current vector control on the generator) of the vibration suppression method of the wind power generator shown in FIG. 1. The wind power generator vibration method in this embodiment includes the following steps S201 to S202.

In step S201, a specified value $I_{d\_ref}$ of a direct-axis current of the generator and a specified value $I_{q\_ref}$ of a quadrature-axis current of the generator are calculated according to a preset value $P_{e\_ref}$ of an electromagnetic active power of the generator and a frequency f of the generator.

Figure 3:
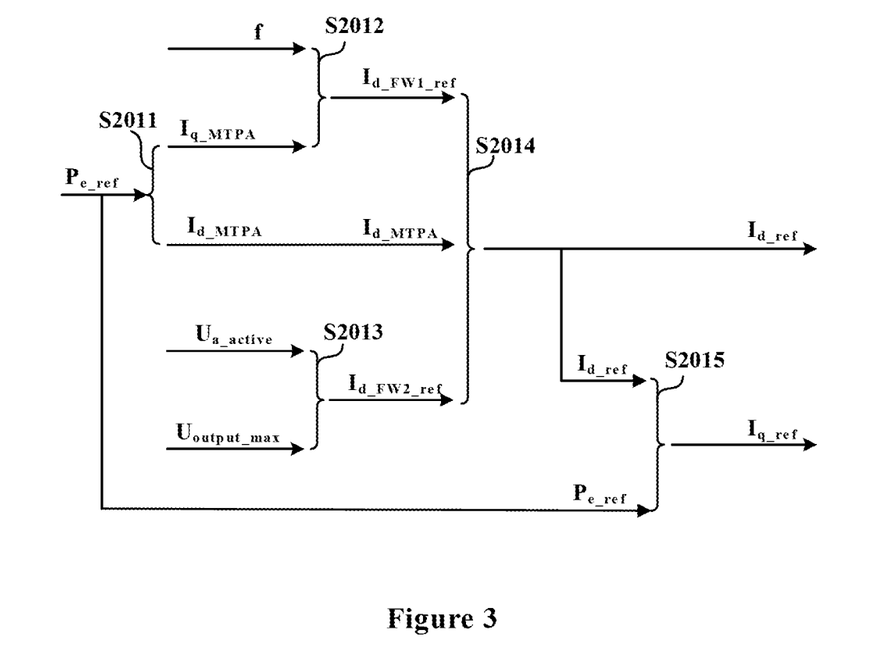
FIG. 3 is a flow chart of a step of calculating a specified value of a flux-weakening control parameter of a generator illustrated in the embodiment shown in FIG. 2.

Reference is made to FIG. 3, which illustrates a flow chart of a step of calculating a specified value of a flux-weakening control parameter of the generator illustrated in the embodiment shown in FIG. 2. The step may include the following steps S2011 to S2015 as shown in FIG. 3.

In step S2011, an optimal maximum output torque value $I_{q\_MTPA}$ of the quadrature-axis current of the generator and an optimal maximum output torque value $I_{d\_MTPA}$ of the direct-axis current of the generator are obtained according to a preset value $P_{e\_ref}$ of the electromagnetic active power of the generator.

This step is based on maximum torque per ampere (MTPA) control (also known as optimal torque control). An optimal combination of a direct-axis current component and a quadrature-axis current component of the generator is obtained according to electromagnetic characteristics of the generator, to make the optimal combination meet a maximum generator output torque per ampere. In a case of a given output torque of the generator, the direct-axis current component (i.e. an optimal maximum output torque value $I_{d\_MTPA}$ of the direct-axis current of the generator) and a quadrature-axis current component (i.e. an optimal maximum output torque value $I_{q\_MTPA}$ of the quadrature-axis current of the generator) of the generator are optimally allocated according to the preset value $P_{e\_ref}$ of the electromagnetic active power of the generator, so as to optimize performances of the generator, improve the operating efficiency, reduce copper loss of the generator and lower the capacity requirement of the generator. The MTPA control in this step may be achieved by applying the existing various kinds of MTPA control methods, such as the analytical method or the finite element analysis method, which will not be described herein. In addition, the MTPA control in this step may be achieved by experimental test in advance and the look-up table method.

In step S2012, a first flux-weakening specified value $I_{d\_FW\,1\_ref}$ of the direct-axis current of the generator is obtained according to the optimal maximum output torque value $I_{q\_MTPA}$ of the quadrature-axis current and the frequency f of the generator.

In this step, the electromagnetic force of the generator are reduced according to the maximum flux-weakening capability of a converter, to suppress the vibration and the noise of the generator, which is an important step of the method for suppressing the vibration and the noise of the generator through flux-weakening control. The optimal maximum output torque value $I_{q\_MTPA}$ of the quadrature-axis current of the generator is obtained in the foregoing step S2011, and the frequency f of the generator may be calculated by the following formula:

$$f = \frac{np_n}{60}$$

where n denotes a rotate speed of the generator which may be obtained through measurement, and $p_n$ denotes the number of pole pairs of the generator.

When the frequency f of the generator is beyond a frequency range of requiring the vibration and noise suppression, the first flux-weakening specified value $I_{d\_FW\,1\_ref}$ of the direct-axis current of the generator is zero. When the frequency f of the generator is within the frequency range of requiring vibration and noise suppression, the first flux-weakening specified value $I_{d\_FW\,1\_ref}$ of the direct-axis current of the generator is calculated by the following formula:

$$I_{d\_FW\,1\_ref} = \sqrt{I^2_{a\_rated\_max} - I^2_{q\_MTPA}}$$

where $I_{a\_rated\_max}$ denotes a maximum value of a rated phase current of the generator, which is determined by a rated heat value of the generator.

The frequency range of requiring vibration and noise suppression may be determined by the following procedures: analyzing a vibration mode order and a frequency of a stator and rotor mechanical structural modal of the generator, and a force wave order and a frequency of electromagnetic force of the generator; determining an overlapping region between the vibration mode order and the force wave order and an overlapping region between the frequency of the stator and rotor mechanical structural modal and the frequency of electromagnetic force; determining a frequency of requiring vibration and noise suppression of the generator through test; and setting a frequency range of plus or minus 5% of the determined frequency as the frequency range of requiring vibration and noise suppression.

In step S2013, a second flux-weakening specified value $I_{d\_FW\_2\_ref}$ of the direct-axis current of the generator is obtained according to an actual value $U_{a\_active}$ of a phase voltage of the generator and a maximum output voltage $U_{output\_max}$ of the converter.

This step is based on a flux-weakening control. When an actual value $U_{a\_active}$ of the phase voltage of the generator reaches to the maximum output voltage $U_{output\_max}$ of the converter, flux-weakening control technology is applied to make the actual value $U_{a\_active}$ of the phase voltage of the generator no longer go up. That is, the generator is controlled to operate with the actual value $U_{a\_active}$ of the phase voltage thereof being smaller than or equal to the maximum output voltage $U_{output\_max}$ of the converter. An operation mode of the generator converts from a constant-torque operation mode to a constant-power operation mode, and a range of rotate speed of the generator is enlarged. The maximum output voltage $U_{output\_max}$ of the converter may be obtained according to a direct current bus voltage $U_{dc}$ of the converter. A voltage difference $U_{diff}$ between the actual value $U_{a\_active}$ of the phase voltage of the generator and the maximum output voltage $U_{output\_max}$ of the converter is inputted to a voltage PI regulator (a proportional-integral regulator) to regulate the second flux-weakening specified value $I_{d\_FW\_2\_ref}$ of the direct-axis current of the generator. The flux-weakening control may be achieved by the existing various kinds of flux-weakening control methods, which will not be described in detail for simplicity.

In step S2014, a specified value $I_{d\_ref}$ of the direct-axis current of the generator is obtained according to the first flux-weakening specified value $I_{d\_FW\_1\_ref}$ of the direct-axis current of the generator, the optimal maximum output torque value $I_{d\_MTPA}$ of the direct-axis current of the generator and the second flux-weakening specified value $I_{d\_FW\_2\_ref}$ of the direct-axis current of the generator.

The first flux-weakening specified value $I_{d\_FW\_1\_ref}$ of the direct-axis current of the generator is obtained in the above step S2012. The optimal maximum output torque value $I_{d\_MTPA}$ of the direct-axis current of the generator is obtained in the above step S2011. The second flux-weakening specified value $I_{d\_FW\_2\_ref}$ of the direct-axis current of the generator is obtained in the above step S2013. When the first flux-weakening specified value $I_{d\_FW\_1\_ref}$ and the second flux-weakening specified value $I_{d\_FW\_2\_ref}$ of the direct-axis current of the generator are both zero, the optimal maximum output torque value $I_{d\_MTPA}$ of the direct-axis current of the generator is served as the specified value $I_{d\_ref}$ of the direct-axis current of the generator, that is, $I_{d\_ref}=I_{d\_MTPA}$. When at least one of the first flux-weakening specified value $I_{d\_FW\_1\_ref}$ and the second flux-weakening specified value $I_{d\_FW\_2\_ref}$ of the direct-axis current of the generator is not equal to zero, the smaller one of the first flux-weakening specified value $I_{d\_FW\_1\_ref}$ and the second flux-weakening specified value $I_{d\_FW\_2\_ref}$ of the direct-axis current of the generator is served as the specified value $I_{d\_ref}$ of direct-axis current of the generator, that is, $I_{d\_ref}=\mathrm{Min}\,(I_{d\_FW\_1\_ref}, I_{d\_FW\_2\_ref})$.

In step S2015, a specified value $I_{q\_ref}$ of the quadrature-axis current of the generator is calculated according to the specified value $I_{d\_ref}$ of the direct-axis current of the generator and the preset value $P_{e\_ref}$ of the electromagnetic active power of the generator.

The specified value $I_{d\_ref}$ of the direct-axis current of the generator is obtained in the above step S2014 and the preset value $P_{e\_ref}$ of the electromagnetic active power of the generator is known, hence the specified value $I_{q\_ref}$ of the quadrature-axis current of the generator is calculated by the following formula:

$$I_{q\_ref}=(1.5P_{e\_ref}-U_d I_{d\_ref})/U_q$$

where $U_d$ denotes a direct-axis voltage of the generator, and $U_q$ denotes a quadrature-axis voltage of the generator.

In step S202, a current vector control is performed on the generator according to the specified value $I_{d\_ref}$ of the direct-axis current of the generator and the specified value $I_{q\_ref}$ of the quadrature-axis current of the generator.

The specified value $I_{d\_ref}$ of the direct-axis current of the generator is obtained in the above step S2014 and the specified value $I_{q\_ref}$ of the quadrature-axis current of the generator is obtained in the above step S2015. Then, the converter performs the current vector control on the generator according to the specified value $I_{d\_ref}$ of the direct-axis current of the generator and the specified value $I_{q\_ref}$ of the quadrature-axis current of the generator. When the frequency f of the generator is within the frequency range of requiring the vibration and noise suppression, the converter operates in the flux-weakening control manner to suppress the vibration and noise of the generator.

According to the vibration suppression method and device of the wind power generator provided by the present disclosure, the specified value of the direct-axis current of the generator and the specified value of the quadrature-axis current of the generator are calculated according to the preset value of electromagnetic active power of the generator and the frequency of the generator. Then, a current vector control is performed on the generator according to the specified value of the direct-axis current of the generator and the specified value of the quadrature-axis current of the generator. Through flux-weakening control, a magnetic load of the generator is decreased, that is, the electromagnetic force on the stator and the rotor of the generator is decreased. Thus, vibration amplitude of the stator and rotor of the generator is reduced, and the vibration and noise suppression is implemented. Since there is no need to change a mechanical structure and electromagnetic design of the generator, performances of the venerator such like power density and force-energy index, are not influenced, and the complexity of manufacturing process and the cost of the generator are not increased.

Third Embodiment

Figure 4:
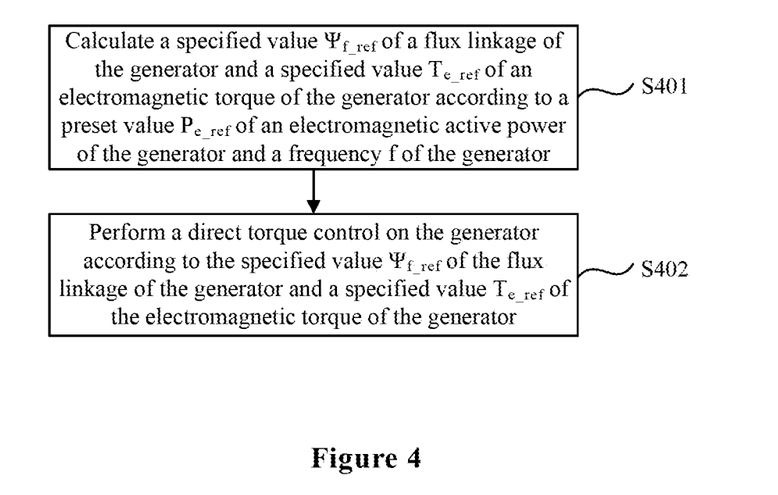
FIG. 4 is a flow chart of a vibration suppression method of a wind power generator according to another embodiment of the present disclosure.

Reference is made to FIG. 4, which illustrates a flow chart of a vibration suppression method of a wind power generator according to another embodiment of the present disclosure. As shown in FIG. 4, the vibration suppression method of the wind power generator in this embodiment provides another implementation (that is, the case of performing a direct torque control on the generator) of the vibration suppression method of the wind power generator shown in FIG. 1. The vibration suppression method of the wind power generator in this embodiment includes the following steps S401 to S402.

In step S401, a specified value $\psi_{f\_ref}$ of a flux linkage of the generator and a specified value $T_{e\_ref}$ of an electromagnetic torque of the generator are calculated according to a preset value $P_{e\_ref}$ of an electromagnetic active power of the generator and a frequency f of the generator.

Figure 5:
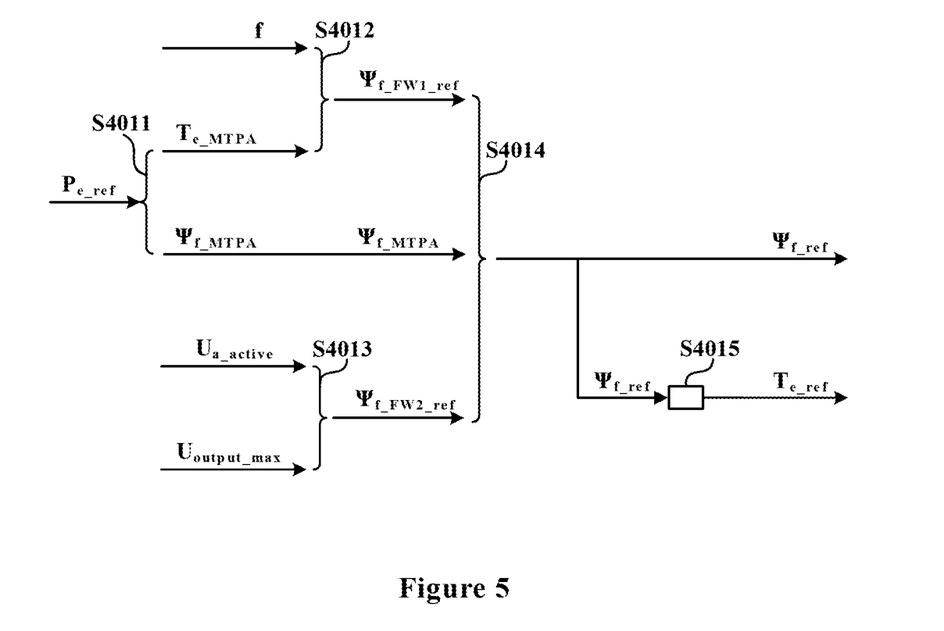
FIG. 5 is a flow chart of a step of calculating a specified value of a flux-weakening control parameter of a generator illustrated in the embodiment shown in FIG. 4.

Reference is made to FIG. 5, which illustrates a flow chart of a step of calculating a specified value of a flux-weakening control parameter of the generator in an embodiment shown in FIG. 4. The step may include the following steps S4011 to S4015 as shown in FIG. 5.

In step S4011, an optimal maximum output torque value $T_{e\_MTPA}$ of the electromagnetic torque of the generator and an optimal maximum output torque value $\psi_{f\_MTPA}$ of the flux linkage of the generator are obtained according to a preset value $P_{e\_ref}$ of the electromagnetic active power of the generator.

This step is based on MTPA control. An optimal combination of the flux linkage and the electromagnetic torque of the generator is obtained according to electromagnetic characteristics of the generator, to make a maximum generator output torque per ampere. In a case of a given output torque of the generator, the flux linkage (i.e. the optimal maximum output torque value $\psi_{f\_MTPA}$ of the flux linkage of the generator) and the electromagnetic torque (i.e. the optimal maximum output torque value $T_{e\_MTPA}$ of the electromagnetic torque of the generator) of the generator are optimally allocated according to the preset point value $P_{e\_ref}$ of the electromagnetic active power of the generator, so as to optimize performances of the generator, improve the operating efficiency, reduce copper loss of the generator and lower the capacity requirement of the generator. The MTPA control in this step may be achieved by applying the existing various kinds of MTPA control methods, such as the analytical method or the finite element analysis method which will not be described herein. In addition, the MTPA control in this step may be achieved by experimental test in advance and the look-up table method.

In step S4012, a first flux-weakening specified value $\psi_{f\_FW1\_ref}$ of the flux linkage of the generator is obtained according to the optimal maximum output torque value $T_{e\_MTPA}$ of the electromagnetic torque of the generator and the frequency f of the generator.

In this step, electromagnetic force of the generator are reduced according to the maximum flux-weakening capability of a converter, to suppress the vibration and the noise of the generator, which is an important step of the method for suppressing the vibration and the noise of the generator through flux-weakening control. The optimal maximum output torque value $T_{e\_MTPA}$ of the electromagnetic torque of the generator is obtained in the foregoing step S4011, and the frequency f of the generator may be calculated by the following formula:

$$f = \frac{np_n}{60}$$

where n denotes a rotate speed of the generator which may be obtained through measurement, and $p_n$ denotes the number of pole pairs of the generator.

When the frequency f of the generator is beyond a frequency range of requiring the vibration and noise suppression, the first flux-weakening preset value $\psi_{f\_FW1\_ref}$ of the flux linkage of the generator is a preset value $\psi_{f\_rated\_ref}$ of a rated flux linkage. When the frequency f of the generator is within the frequency scope of requiring the vibration and noise suppression, the first flux-weakening preset value $\psi_{f\_FW1\_ref}$ of the flux linkage of the generator is calculated by the following formula:

$$\psi_{f\_FW1\_ref} = (U_{a\_active} - R_a I_{a\_rated\_max})/\omega_e$$

$$\omega_e = \frac{2\pi np_n}{60} = \frac{\pi np_n}{30}$$

where $U_{a\_active}$ denotes an actual value of a phase voltage of the generator, $R_a$ denotes a resistance of a stator winding of the generator; $I_{a\_rated\_max}$ denotes a maximum value of a rated phase current of the generator, which is determined by a rated heat value of the generator; $\omega_e$ denotes an electrical angular speed of the generator; $p_n$ denotes the number of pole pairs of the electrical angular velocity; and n denotes a rotate speed of the electrical angular velocity, which can be obtained through measurement.

The frequency range of requiring the vibration and noise suppression may be determined according to related descriptions in the step S2012 of the embodiment illustrated by FIG. 2, which will not be described again herein for simplicity.

In step S4013, a second flux-weakening specified value $\psi_{f\_FW2\_ref}$ of the flux linkage of the generator is obtained according to an actual value $U_{a\_active}$ of a phase voltage of the generator and a maximum output voltage $U_{output\_max}$ of a converter.

This step is based on the flux-weakening control. When an actual value $U_{a\_active}$ of the phase voltage of the generator reaches to the maximum output voltage $U_{output\_max}$ of the converter, flux-weakening control technology is applied to make the actual value $U_{a\_active}$ of the phase voltage of the generator no longer go up. That is, the generator is controlled to operate with the actual value $U_{a\_active}$ of the phase voltage thereof being smaller than or equal to the maximum output voltage $U_{output\_max}$ of the converter. An operation mode of the generator converts from a constant-torque operation mode to a constant-power operation mode, and the range of rotate speed of the generator is enlarged. The maximum output voltage $U_{output\_max}$ of the converter may be obtained according to a direct current bus voltage $U_{dc}$ of the converter. A voltage difference $U_{diff}$ between the actual value $U_{a\_active}$ of the phase voltage of the generator and the maximum output voltage $U_{output\_max}$ of the converter is inputted to a voltage PI regulator to regulate the second flux-weakening specified value $\psi_{f\_FW2\_ref}$ of the flux linkage of the generator. The flux-weakening control may be achieved by the existing various kinds of flux-weakening control methods, which will not be described in detail herein for simplicity.

In step S4014, the specified value $\psi_{f\_ref}$ of the flux linkage of the generator is obtained according to the first flux-weakening specified value $\psi_{f\_FW1\_ref}$ of the flux linkage of the generator, the optimal maximum output torque value $\psi_{f\_MTPA}$ of the flux linkage of the generator and a second flux-weakening specified value $\psi_{f\_FW2\_ref}$ of the flux linkage of the generator.

The first flux-weakening specified value $\psi_{f\_FW1\_ref}$ of the flux linkage of the generator is obtained in the above step S4012. The optimal maximum output torque value $\psi_{f\_MTPA}$ of the flux linkage of the generator is obtained in the above step S4011. The second flux-weakening specified value $\psi_{f\_FW\_2\_ref}$ of the flux linkage of the generator is obtained in the above step S4013. When the first flux-weakening specified value $\psi_{f\_FW\_1\_ref}$ and the second flux-weakening specified value $\psi_{f\_FW\_2\_ref}$ of the flux linkage of the generator are both equal to the preset value $\psi_{f\_rated\_ref}$ of the rated flux linkage, the optimal maximum output torque value $\psi_{f\_MTPA}$ of the flux linkage of the generator is served as a specified value $\psi_{f\_ref}$ of the flux linkage of the generator, that is, $\psi_{f\_ref}=\psi_{f\_MTPA}$. When at least one of the first flux-weakening specified value $\psi_{f\_FW\_1\_ref}$ and the second flux-weakening specified value $\psi_{f\_FW\_2\_ref}$ of the flux linkage of the generator is not equal to the preset value $\psi_{f\_rated\_ref}$ of the rated flux linkage, the smaller one from the first flux-weakening specified value $\psi_{f\_FW\_1\_ref}$ and the second flux-weakening specified value $\psi_{f\_FW\_2\_ref}$ of the flux linkage of the generator is served as a specified value $\psi_{f\_ref}$ of the flux linkage of the generator, that is, $\psi_{f\_ref}=\mathrm{Min}\,(\psi_{f\_FW\_1\_ref},\psi_{f\_FW\_2\_ref})$.

In step S4015, the specified value $T_{f\_ref}$ of the electromagnetic torque of the generator is calculated according to the specified value $\psi_{f\_ref}$ of the flux linkage of the generator.

The specified value $\psi_{f\_ref}$ of the flux linkage of the generator is obtained in the above step S4014, hence the specified value $T_{f\_ref}$ of the electromagnetic torque of the generator is calculated by the following formula:

$$T_{e\_ref}=1.5P_n(\psi_{f\_\alpha\_ref}I_\beta-\psi_{f\_\beta\_ref}I_\alpha)$$

where $p_n$ denotes the number of generator pole pairs, $\psi_{f\_ref}$ denotes $\alpha$ axis component of the specified value $\psi_{f\_ref}$ of the flux linkage of the generator, $\psi_{f\_ref}$ denotes a $\beta$ axis component of the specified value $\psi_{f\_ref}$ of the flux linkage of the generator, $I_\alpha$ denotes $\alpha$ axis current of the generator, and $I_\beta$ denotes a $\beta$ axis current of the generator.

In step S402, a direct torque control is performed on the generator according to the specified value $\psi_{f\_ref}$ of the flux linkage of the generator and the specified value $T_{e\_ref}$ of the electromagnetic torque of the generator.

The specified value $\psi_{f\_ref}$ of the flux linkage of the generator is obtained in the above step S4014 and the specified value $T_{e\_ref}$ of the electromagnetic torque of the generator is obtained in the above step S4015. Thus, the converter performs the direct torque control on the generator according to the specified value $\psi_{f\_ref}$ of the flux linkage of the generator and the specified value $T_{e\_ref}$ of the electromagnetic torque of the generator.

According to the vibration suppression method and device of the wind power generator provided by the present disclosure, the specified value of the flux linkage of the generator and the specified value of the electromagnetic torque of the generator are calculated according to a preset value of the electromagnetic active power of the generator and the frequency of the generator. Then, a direct torque control is performed on the generator according to the specified value of the flux linkage of the generator and the specified value of the electromagnetic torque of the generator. Through flux-weakening control, a magnetic load of the generator is decreased, that is, the electromagnetic force on the stator and the rotor of the generator is decreased, vibration amplitude of the stator and the rotor of the generator are reduced, and the vibration and noise suppression is implemented. Since there is no need to change a mechanical structure and electromagnetic design of the generator, performances of the generator such like power density and force-energy index are not influenced, and the complexity of manufacturing processes and the cost of the generator are not increased.

Fourth Embodiment

Figure 6:
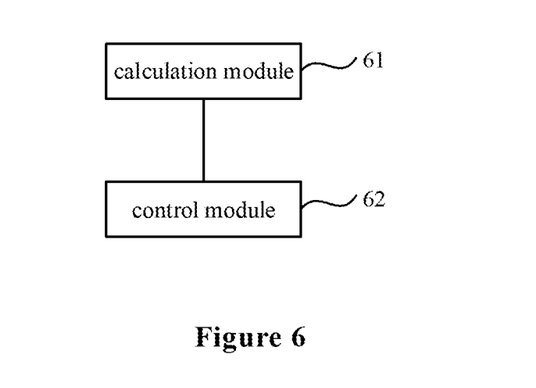
FIG. 6 is a schematic structural diagram of a vibration suppression device of a wind power generator according to an embodiment of the present disclosure.

Reference is made to FIG. 6, which illustrates a schematic structural diagram of a vibration suppression device of a wind power generator according to an embodiment of the present disclosure. As shown in FIG. 6, the vibration suppression device of the wind power generator in this embodiment can implement the vibration suppression method of the wind power generator in the embodiment shown in FIG. 1. Specifically, the vibration suppression device of the wind power generator in this embodiment may include: a calculation module 61 and a control module 62. The calculation module 61 is configured to calculate a specified value of a flux-weakening control parameter of a generator according to a preset value $P_{e\_ref}$ of an electromagnetic active power of the generator and a frequency f of the generator. The control module 62 is configured to control the generator according to the specified value of the flux-weakening control parameter of the generator.

The detailed procedures for achieving the functions of each module in this embodiment can be found in related descriptions in the embodiment shown in FIG. 1, which will not be described again herein for simplicity.

According to the wind power generator vibration suppression method and device provided by the present disclosure, the specified value of the flux-weakening control parameter of the generator is calculated according to the preset value of the electromagnetic active power of the generator and the frequency of the generator. Then, the generator is controlled according to the specified value of the flux-weakening control parameter of the generator. A magnetic load of the generator is decreased by flux-weakening control. That is, electromagnetic forces on the stator and the rotor of the generator are decreased, vibration amplitudes of the stator and the rotor of the generator are reduced, and the vibration and noise suppression is implemented. Since there is no need to change a mechanical structure and electromagnetic design of the generator, performances of the generator such like power density and force-energy index are not influenced, and the complexity of manufacturing process and the cost of the generator are not increased.

Fifth Embodiment

Figure 7:
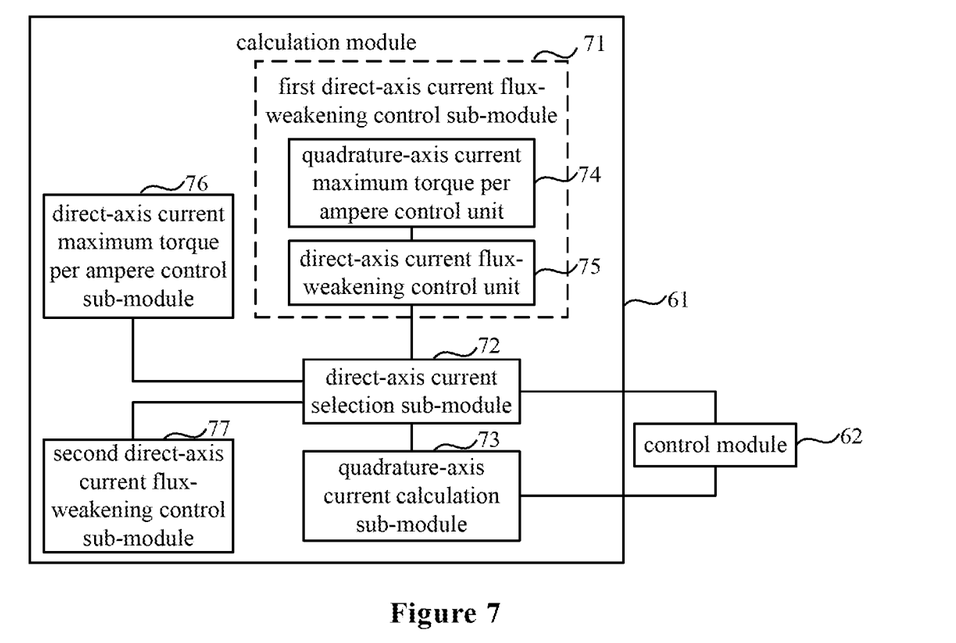
FIG. 7 is a schematic structural diagram of a vibration suppression device of a wind power generator according to another embodiment of the present disclosure.

Reference is made to FIG. 7, which illustrates a schematic structural diagram of a vibration suppression device of a wind power generator according to another embodiment of the present disclosure. FIG. 7 shows a specific structure of the vibration suppression device of the wind power generator in the embodiment shown in FIG. 6 (in a case of performing a current vector control on the generator), and the device can implement the vibration suppression method of the wind power generator in the embodiment shown in FIG. 2. Specifically, the calculation module 61 in the embodiment shown in FIG. 6 is configured to obtain a specified value $I_{d\_ref}$ of a direct-axis current of the generator and a specified value $I_{q\_ref}$ of a quadrature-axis current of the generator according to a preset value $P_{e\_ref}$ of an electromagnetic active power of the generator and a frequency f of the generator.

The control module 62 in the embodiment shown in FIG. 6 is configured to perform a current vector control on the generator according to the specified value $I_{d\_ref}$ of the direct-axis current of the generator and the specified value $I_{q\_ref}$ of the quadrature-axis current of the generator.

Further, the calculation module 61 may include: a first direct-axis current flux-weakening control sub-module 71 configured to obtain a first flux-weakening specified value $I_{d\_FW\_1\_ref}$ of a direct-axis current of the generator according to a preset value $P_{e\_ref}$ of an electromagnetic active power of the generator and a frequency f of the generator; a direct-axis current selection sub-module 72 configured to obtain a specified value $I_{d\_ref}$ of the direct-axis current of the generator according to a first flux-weakening specified value $I_{d\_FW\ 1\_ref}$ of the direct-axis current of the generator, an optimal maximum output torque value $I_{d\_MTPA}$ of the direct-axis current of the generator and a second flux-weakening specified value $I_{d\_FW\ 2\_ref}$ of the direct-axis current of the generator; and a quadrature-axis current calculation sub-module 73 configured to calculate a specified value $I_{q\_ref}$ of a quadrature-axis current of the generator according to the specified value $I_{d\_ref}$ of the direct-axis current of the generator and the preset value $P_{e\_ref}$ of the electromagnetic active power of the generator.

Further, the first direct-axis current flux-weakening control sub-module 71 further include: a quadrature-axis current maximum torque per ampere control unit 74 configured to obtain an optimal maximum output torque value $I_{q\_MTPA}$ of a quadrature-axis current of the generator according to the preset value $P_{e\_ref}$ of the electromagnetic active power of the generator; and a direct-axis current flux-weakening control unit 75 configured to obtain a first flux-weakening specified value $I_{d\_FW\ 1\_ref}$ of the direct-axis current of the generator according to the optimal maximum output torque value $I_{q\_MTPA}$ of the quadrature-axis current of the generator and the frequency f of the generator.

Further, the calculation module 61 may further include: a direct-axis current maximum torque per ampere control sub-module 76 configured to obtain an optimal maximum output torque value $I_{d\_MTPA}$ of the direct-axis current of the generator according to the preset value $P_{e\_ref}$ of the electromagnetic active power of the generator; and a second direct-axis current flux-weakening control sub-module 77 configured to obtain a second flux-weakening specified value $I_{d\_FW\ 2\_ref}$ of the direct-axis current of the generator according to an actual value $U_{a\_active}$ of a phase voltage of the generator and a maximum output voltage $U_{output\_max}$ of a converter.

The specific procedures for achieving functions of all modules, sub-modules and units can be found in related descriptions in the embodiment shown in FIG. 2, which will not be described again herein for simplicity.

It should be noted that, the functions of the quadrature-axis current maximum torque per ampere control unit 74 and the direct-axis current maximum torque per ampere control sub-module 76 may be achieved by one module in practice.

According to the vibration suppression method and device of the wind power generator provided by the present disclosure, the specified value of the direct-axis current of the generator and the specified value of the quadrature-axis current of the generator are calculated according to the preset value of the electromagnetic active power of the generator and the frequency of the generator. A current vector control is performed on the generator according to the specified value of the direct-axis current of the generator and the specified value of the quadrature-axis current of the generator. A magnetic load of the generator is decreased by flux-weakening control. Thus, electromagnetic forces on the stator and the rotor of the generator are decreased and vibration amplitudes of the stator and the rotor of the generator are reduced, to realize vibration and noise suppression. Since there is no need to change a mechanical structure and electromagnetic design of the generator, performances of the generator such like power density and force-energy index are not influenced, and the complexity of manufacturing processes and the cost of the generator are not increased.

Sixth Embodiment

Figure 8:
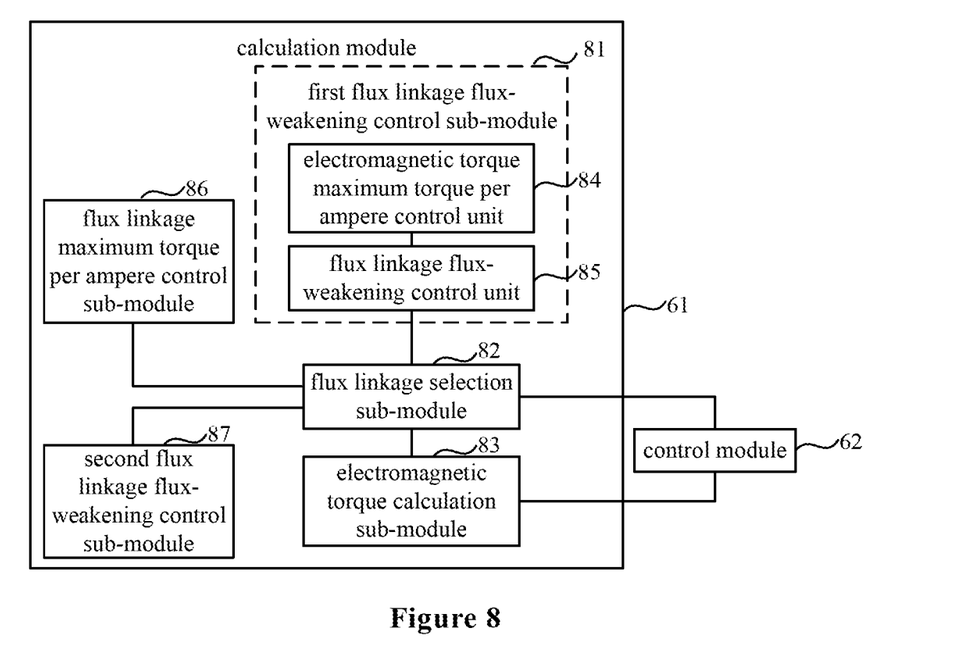
FIG. 8 is a schematic structural diagram of a vibration suppression device of a wind power generator according to another embodiment of the present disclosure.

Reference is made to FIG. 8, which illustrates a schematic structural diagram of a vibration suppression device of a wind power generator according to another embodiment of the present disclosure. FIG. 8 shows a specific structure of the vibration suppression device of the wind power generator in the embodiment shown in FIG. 6 (in a case of performing a direct torque control on the generator), and the device can implement the vibration suppression method of the wind power generator in the embodiment shown in FIG. 4.

Specifically, the calculation module 61 in the embodiment shown in FIG. 6 is further configured to obtain a specified value $\psi_{f\_ref}$ of a flux linkage of the generator and a specified value $T_{e\_ref}$ of an electromagnetic torque of the generator according to a preset value $P_{e\_ref}$ of an electromagnetic active power of the generator and a frequency f of the generator.

The control module 62 in the embodiment shown in FIG. 6 is further configured to perform a direct torque control on the generator according to the specified value $\psi_{f\_ref}$ of the flux linkage of the generator and the specified value $T_{e\_ref}$ of the electromagnetic torque of the generator.

Further, the calculation module 61 may include: a first flux linkage flux-weakening control sub-module 81 configured to obtain a first flux-weakening specified value $\psi_{f\_FW\ 1\_ref}$ of the flux linkage of the generator according to the preset value $P_{e\_ref}$ of the electromagnetic active power of the generator and the frequency f of the generator; a flux linkage selection sub-module 82, configured to obtain the specified value $\psi_{f\_ref}$ of the flux linkage of the generator according to a first flux-weakening specified value $\psi_{f\_FW\ 1\_ref}$ of the flux linkage of the generator, the optimal maximum output torque value $\psi_{f\_MTPA}$ of the flux linkage of the generator and a second flux-weakening specified value $\psi_{d\_FW\ 2\_ref}$ of the flux linkage of the generator; and an electromagnetic torque calculation sub-module 83 configured to calculate the specified value $T_{e\_ref}$ of the electromagnetic torque of the generator according to the specified value $\psi_{f\_ref}$ of the flux linkage of the generator.

Further, the first flux linkage flux-weakening control sub-module 81 may further include: an electromagnetic torque maximum torque per ampere control unit 84 configured to obtain an optimal maximum output torque value $T_{e\_MTPA}$ of the electromagnetic torque of the generator according to the preset value $P_{e\_ref}$ of the electromagnetic active power of the generator; and a flux linkage flux-weakening control unit 85 configured to obtain a first flux-weakening specified value $\psi_{f\_FW\ 1\_ref}$ of the flux linkage of the generator according to the optimal maximum output torque value $T_{e\_MTPA}$ of the electromagnetic torque of the generator and the frequency f of the generator.

Further, the calculation module 61 may further include: a flux linkage maximum torque per ampere control sub-module 86 configured to obtain the optimal maximum output torque value $\psi_{f\_ref}$ of the flux linkage of the generator according to the preset value $P_{e\_ref}$ of the electromagnetic active power of the generator; and a second flux linkage flux-weakening control sub-nodule 87 configured to obtain the second flux-weakening specified value $\psi_{d\_FW\ 2\_ref}$ of the flux linkage of the generator according to an actual value $U_{a\_active}$ of a generator phase voltage of the generator and a maximum output voltage $U_{output\_max}$ of a converter.

The specific procedures for achieving functions of all modules, sub-modules and units can be found in related descriptions in the embodiment shown in FIG. 4, which will not be described again herein for simplicity.

It should be noted that, the functions of the electromagnetic torque maximum torque per ampere control unit 84 and the flux linkage maximum torque per ampere control sub-module 86 may be achieved by one module in practice.

According to the vibration suppression method and device of the wind power generator provided by the present disclosure, the specified value of the flux linkage of the generator and the specified value of the electromagnetic torque of the generator are calculated according to the preset value of the electromagnetic active power of the generator and the frequency of the generator. A direct torque control is performed on the generator according to the specified value of the flux linkage of the generator and the specified value of the electromagnetic torque of the generator. A magnetic load of the generator is decreased by flux-weakening control. That is, electromagnetic forces on the stator and the rotor of the A magnetic load of the generator is decreased are decreased and vibration amplitudes of the stator and the rotor of the generator are reduced, and realize vibration and noise suppression is implemented. Since there is no need to change a mechanical structure and electromagnetic design of the generator, performances of the generator such like power density and force-energy index are not influenced, and the complexity of manufacturing process and the cost of the generator are not increased It should be noted that, the vibration suppression method and device of the wind power generator provided in the present disclosure can also be applied to other generators or motors.

The foregoing is merely embodiments of the present disclosure and is not intended to limit the scope of the present disclosure. Any modifications, equivalent substitutions, improvements, and the like within the technical scope disclosed by the present disclosure are intended to be included within the scope of the present disclosure.

The invention claimed is:

1. A vibration suppression method of a wind power generator, comprising:
   calculating a specified value of a flux-weakening control parameter of the generator based on a preset value of an electromagnetic active power of the generator and a frequency of the generator; and
   controlling the generator based on the specified value of the flux-weakening control parameter of the generator, wherein:
   the flux-weakening control parameter includes a specified value of a direct-axis current of the generator and a specified value of a quadrature-axis current of the generator;
   calculating the specified value of the flux-weakening control parameter of the generator based on the preset value of the electromagnetic active power of the generator and the frequency of the generator further comprises:
      calculating the specified value of the direct-axis current of the generator and the specified value of the quadrature-axis current of the generator based on the preset value of the electromagnetic active power of the generator and the frequency of the generator; and
   controlling the generator based on the specified value of the flux-weakening control parameter of the generator further comprises:
      performing a current vector control on the generator based on the specified value of the direct-axis current of the generator and the specified value of the quadrature-axis current of the generator, or
   wherein:
   the flux-weakening control parameter includes a specified value of a flux linkage of the generator and a specified value of an electromagnetic torque of the generator;
   the calculating a specified value of a flux-weakening control parameter of the generator based on a preset value of an electromagnetic active power of the generator and a frequency of the generator comprises:
      calculating the specified value of the flux linkage of the generator and the specified value of the electromagnetic torque of the generator based on the preset value of the electromagnetic active power of the generator and the frequency of the generator; and
   the controlling the generator based on the specified value of the flux-weakening control parameter of the generator comprises:
      performing a direct torque control on the generator based on the specified value of the flux linkage of the generator and the specified value of the electromagnetic torque of the generator.

2. The method according to claim 1, wherein the calculating the specified value of the direct-axis current of the generator and the specified value of the quadrature-axis current of the generator based on the preset value of the electromagnetic active power of the generator and the frequency of the generator comprises:
   obtaining a first flux-weakening specified value of the direct-axis current of the generator based on the preset value of the electromagnetic active power of the generator and the frequency of the generator;
   obtaining the specified value of the direct-axis current of the generator based on the first flux-weakening specified value of the direct-axis current of the generator, an optimal maximum output torque value of the direct-axis current of the generator and a second flux-weakening specified value of the direct-axis current of the generator; and
   calculating the specified value of the quadrature-axis current of the generator based on the specified value of the direct-axis current of the generator and the preset value of the electromagnetic active power of the generator.

3. The method according to claim 2, wherein the obtaining a first flux-weakening specified value of the direct-axis current of the generator based on the preset value of the electromagnetic active power of the generator and the frequency of the generator further comprises:
   obtaining an optimal maximum output torque value of the quadrature-axis current of the generator based on the preset value of the electromagnetic active power of the generator; and
   obtaining the first flux-weakening specified value of the direct-axis current of the generator based on the optimal maximum output torque value of the quadrature-axis current and the frequency of the generator.

4. The method according to claim 2, wherein the calculating the specified value of the direct-axis current of the generator and the specified value of the quadrature-axis current of the generator based on the preset value of the electromagnetic active power of the generator and the frequency of the generator further comprises:

obtaining the optimal maximum output torque value of the direct-axis current of the generator based on the preset value of the electromagnetic active power of the generator; and obtaining the second flux-weakening specified value of the direct-axis current of the generator based on an actual value of a phase voltage of the generator and a maximum output voltage of a converter.

5. The method according to claim 1, wherein the calculating the specified value of the flux linkage of the generator and the specified value of the electromagnetic torque of the generator based on the preset value of the electromagnetic active power of the generator and the frequency of the generator comprises:

obtaining a first flux-weakening specified value of the flux linkage of the generator based on the preset value of the electromagnetic active power of the generator and the frequency of the generator;

obtaining the specified value of the flux linkage of the generator based on the first flux-weakening specified value of the flux linkage of the generator, an optimal maximum output torque value of the flux linkage of the generator and a second flux-weakening specified value of the flux linkage of the generator; and calculating the specified value of the electromagnetic torque of the generator according to the specified value of the flux linkage of the generator.

6. The method according to claim 5, wherein the obtaining a first flux-weakening specified value of the flux linkage of the generator based on the preset value of the electromagnetic active power of the generator and the frequency of the generator comprises:

obtaining an optimal maximum output torque value of the electromagnetic torque of the generator based on the preset value of the electromagnetic active power of the generator; and obtaining the first flux-weakening specified value of the flux linkage of the generator based on the optimal maximum output torque value of the electromagnetic torque of the generator and the frequency of the generator.

7. The method according to claim 5, wherein the calculating the specified value of the flux linkage of the generator and the specified value of the electromagnetic torque of the generator based on the preset value of the electromagnetic active power of the generator and the frequency of the generator further comprises:

obtaining the optimal maximum output torque value of the flux linkage of the generator based on the preset value of the electromagnetic active power of the generator; and obtaining the second flux-weakening specified value of the flux linkage of the generator based on an actual value of a phase voltage of the generator and a maximum output voltage of a converter.

8. A vibration suppression device of a wind power generator, comprising:

a calculation module, configured to calculate a specified value of a flux-weakening control parameter of the generator based on a preset value of an electromagnetic active power of the generator and a frequency of the generator; and a control module, configured to control the generator based on the specified value of the flux-weakening control parameter of the generator, wherein:
the flux-weakening control parameter includes a specified value of a direct-axis current of the generator and a specified value of a quadrature-axis current of the generator;

the calculation module is further configured to calculate the specified value of the direct-axis current of the generator and the specified value of the quadrature-axis current of the generator based on the preset value of the electromagnetic active power of the generator and the frequency of the generator; and the control module is further configured to perform a current vector control on the generator based on the specified value of the direct-axis current of the generator and the specified value of the quadrature-axis current of the generator, or wherein:
the flux-weakening control parameter includes a specified value of a flux linkage of the generator and a specified value of an electromagnetic torque of the generator;

the calculation module is further configured to obtain the specified value of the flux linkage of the generator and the specified value of the electromagnetic torque of the generator based on the preset value of the electromagnetic active power of the generator and the frequency of the generator; and the control module is further configured to perform a direct torque control on the generator based on the specified value of the flux linkage of the generator and the specified value of the electromagnetic torque of the generator.

9. The device according to claim 8, wherein the calculation module comprises:

a first direct-axis current flux-weakening control sub-module, configured to obtain a first flux-weakening specified value of the direct-axis current of the generator based on the preset value of the electromagnetic active power of the generator and the frequency of the generator;

a direct-axis current selection sub-module, configured to obtain the specified value of the direct-axis current of the generator based on the first flux-weakening specified value of the direct-axis current of the generator, an optimal maximum output torque value of the direct-axis current of the generator and a second flux-weakening specified value of the direct-axis current of the generator; and a quadrature-axis current calculation sub-module, configured to calculate the specified value of the quadrature-axis current of the generator based on the specified value of the direct-axis current of the generator and the preset value of the electromagnetic active power of the generator.

10. The device according to claim 9, wherein the first direct-axis current flux-weakening control sub-module comprises:

a quadrature-axis current maximum torque per ampere control unit, configured to obtain an optimal maximum output torque value of the quadrature-axis current of the generator based on the preset value of the electromagnetic active power of the generator; and a direct-axis current flux-weakening control unit, configured to obtain the first flux-weakening specified value of the direct-axis current of the generator based on the optimal maximum output torque value of the quadrature-axis current of the generator and the frequency of the generator.

11. The device according to claim 9, wherein the calculation module further comprises:
- a direct-axis current maximum torque per ampere control sub-module, configured to obtain the optimal maximum output torque value of the direct-axis current of the generator based on the preset value of the electromagnetic active power of the generator; and
- a second direct-axis current flux-weakening control sub-module, configured to obtain the second flux-weakening specified value of the direct-axis current of the generator based on an actual value of a phase voltage of the generator and a maximum output voltage of a converter.

12. The device according to claim 8, wherein the calculation module comprises:
- a first flux linkage flux-weakening control sub-module, configured to obtain a first flux-weakening specified value of the flux linkage of the generator based on the preset value of the electromagnetic active power of the generator and the frequency of the generator;
- a flux linkage selection sub-module, configured to obtain the specified value of the flux linkage of the generator based on the first flux-weakening specified value of the flux linkage of the generator, an optimal maximum output torque value of the flux linkage of the generator and a second flux-weakening specified value of the flux linkage of the generator; and
- an electromagnetic torque calculation sub-module, configured to calculate the specified value of the electromagnetic torque of the generator based on the specified value of the flux linkage of the generator.

13. The device according to claim 12, wherein the first flux linkage flux-weakening control sub-module comprises:
- an electromagnetic torque maximum torque per ampere control unit, configured to obtain an optimal maximum output torque value of the electromagnetic torque of the generator based on the preset value of the electromagnetic active power of the generator; and
- a flux linkage flux-weakening control unit, configured to obtain the first flux-weakening specified value of the flux linkage of the generator based on the optimal maximum output torque value of the electromagnetic torque of the generator and the frequency of the generator.

14. The device according to claim 12, wherein the calculation module further comprises:
- a flux linkage maximum torque per ampere control sub-module, configured to obtain the optimal maximum output torque value of the flux linkage of the generator based on the preset value of the electromagnetic active power of the generator; and
- a second flux linkage flux-weakening control sub-module, configured to obtain the second flux-weakening specified value of the flux linkage of the generator based on an actual value of a phase voltage of the generator and a maximum output voltage of a converter.

* * * * *